Nov. 23, 1965 F. R. WILSON 3,218,837
DOUBLE-FLARE DIE FOR TUBE FLARING TOOL
Original Filed Feb. 16, 1955
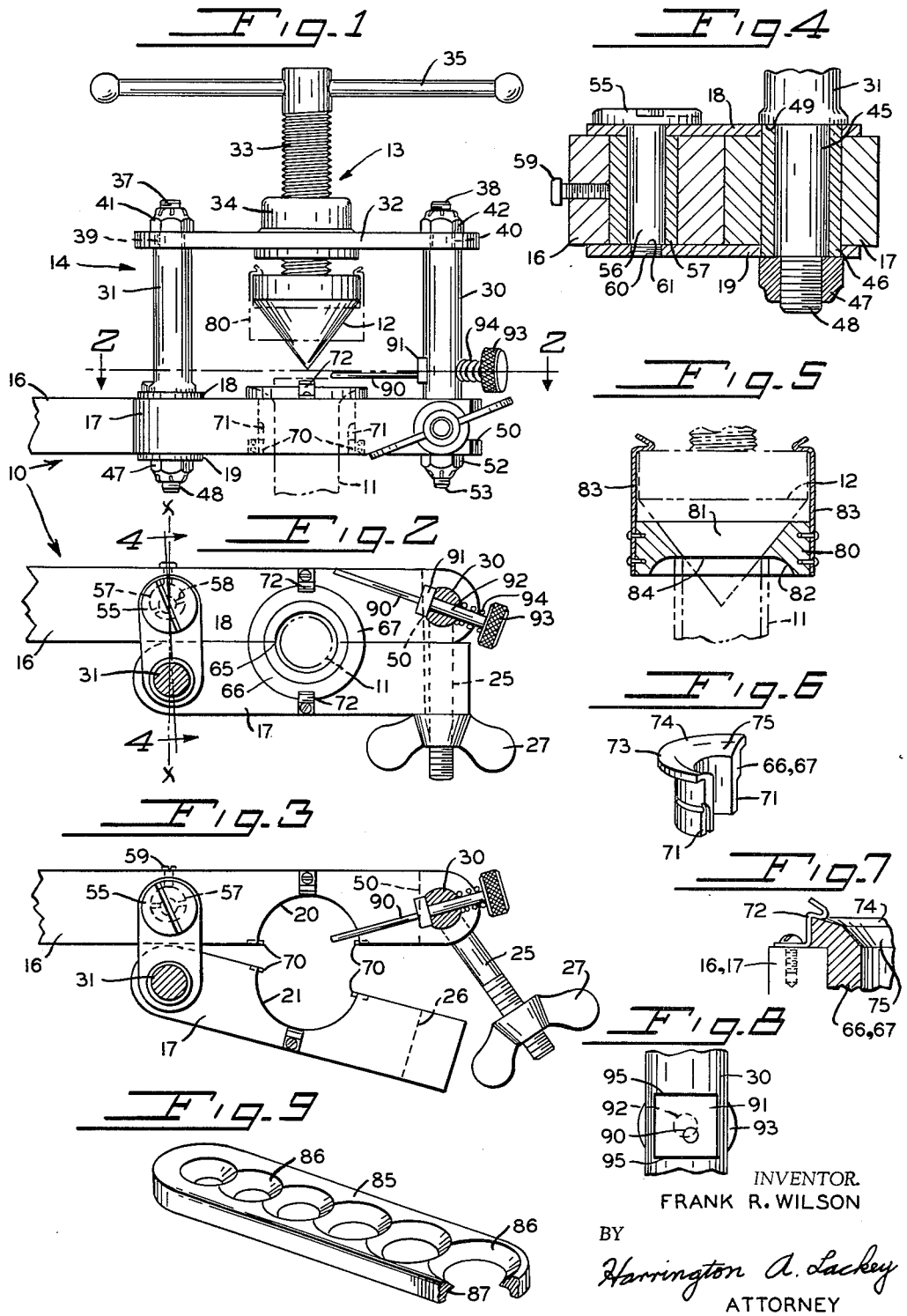
INVENTOR.
FRANK R. WILSON
BY
Harrington A. Lackey
ATTORNEY

United States Patent Office 3,218,837
Patented Nov. 23, 1965

3,218,837
DOUBLE-FLARE DIE FOR TUBE FLARING TOOL
Frank R. Wilson, Memphis, Tenn., assignor to Parker-Hannifin Corporation, Cleveland, Ohio, a corporation of Ohio
Original application Feb. 16, 1955, Ser. No. 488,458, now Patent No. 3,044,531, dated July 17, 1962. Divided and this application May 1, 1962, Ser. No. 216,693
2 Claims. (Cl. 72—317)

This application is a division of application S.N. 488,458, of Frank R. Wilson, filed February 16, 1955, now Pat. No. 3,044,531, granted on July 17, 1962.

This invention relates to a tube flaring tool and, more particularly, to a hand operated tool adapted to provide accurately dimensioned single or double flares on the ends of tubes of varying sizes.

The tube flaring tool forming the subject of the present invention contains a number of novel features not heretofore known to the art and which greatly facilitate the use of the tool in forming correctly dimensioned flares on the various sizes of tubing adapted to be handled by the tool.

Double flares may be produced by the tool through the use of a novel form of double-flare die which fits over the flaring cone and provides a pressure face for engaging the end of the tube for expanding the same as the cone is forced into the tube. The tip of the cone is adapted to project through an aperture in the die and act as an abutment to prevent inward movement of the end of the tube as it is expanded by the die. The novel double-flare die shown herein may be made either with a single pressure face, as shown, or with a multiple pressure face as shown and described in my co-pending patent application Serial No. 338,303, filed February 24, 1953, for Flaring Tool, now Patent No. 2,852,839.

Accordingly, it is an object of my invention to provide an improved tube flaring tool which is capable of forming accurately dimensioned flares of either a single or double character on tubing of various sizes.

Another object of my invention is to provide a novel type of double-forming die of simplified construction.

With these and other objects in view which will become apparent from the following description, the invention includes certain novel features of construction and combinations of parts the essential elements of which are set forth in the appended claims and a preferred form or embodiment of which will hereinafter be described with reference to the drawings which accompany and form a part of this specification.

In the drawings:

FIG. 1 is a side elevation of a tube flaring tool constructed in accordance with the teachings of my invention.

FIG. 2 is a cross-sectional view taken along the line 2—2 in FIG. 1.

FIG. 3 is a view similar to that shown in FIG. 2 but with the clamping members swung open and with the die inserts removed therefrom.

FIG. 4 is a cross-sectional elevation taken along the line 4—4 in FIG. 2.

FIG. 5 is an enlarged cross-sectional view taken through one of the double-flaring dies.

FIG. 6 is a perspective view of one of the die inserts.

FIG. 7 is a fragmentary cross-sectional view showing one of the retaining clips for holding the die inserts in place.

FIG. 8 is a fragmentary view showing the stop for gauging the height of the tube for single flares.

FIG. 9 is a perspective view of a double-flare die plate containing a plurality of die faces of different sizes.

The tube flaring tool herein shown consists generally of a clamping means 10 for holding the tube 11 which is to be flared, a flaring cone 12 for spreading the end of the tube to form a flare of the desired shape and size thereon, a feeding means 13 for advancing the cone into the tube and for removing it therefrom, and a yoke 14 for supporting the feeding means and flaring cone above the end of the tube to be flared. Giving detailed consideration first to the clamping means 10, it will be seen from FIG. 2 that this means consists essentially of a pair of bar-type clamping members 16 and 17 which are hingedly connected with one another by a pair of links 18 and 19 (FIGS. 1 and 4) to permit the members to be swung from their closed positions shown in FIG. 2 to their open positions shown in FIG. 3. The clamping members 16 and 17 (FIG. 2) are each provided with a recess 20 and 21, respectively, for receiving die inserts 67 and 66 by means of which the clamping means may be adapted to receive different sizes of tubing. After the tube to be flared has been inserted in the clamping apertures provided by the inserts 22 and 23, and the clamping members 16 and 17 have been closed as shown in FIG. 2, the clamping members may be drawn tightly against the tube by a clamping device including a swing-bolt 25 which is receivable within a notch 26 (FIG. 3) provided in the distal end of the member 17 and which may be tightened down on the member by means of a wing-nut 27. The swing-bolt 25 is fast on the lower end of a swivel post 30 which, together with a similar post 31 (FIG. 1) provides support for a strap or cross-bar 32 of the yoke 14.

The flaring cone 12 is swiveled on the lower end of a threaded spindle 33 which runs in a threaded nut 34 secured to the strap 32 so that rotation of the spindle by a handle 35 attached thereto will cause feeding movement of the cone 12 toward or away from the end of the tube 11 as the handle is turned in one direction or the other.

As seen in FIG. 1, the posts 30 and 31 are provided at their upper ends with threaded tenons 37 and 38 which pass through oversize holes 39 and 40, respectively, in the crossbar 32 thereby providing opportunity for sidewise or transverse movement of the crossbar 32 on the posts so as to permit self-alignment of the flaring cone with the tube 11. The crossbar 32 is retained on the posts by means of self-locking nuts 41 and 42 which hold the crossbar against substantial movement in the direction of the longitudinal axis of the posts while permitting it to move freely in the traverse direction.

For this same purpose, freedom may also be provided on the lower ends of the posts at their point of attachment to the clamping members. The means whereby this is accomplished may be similar to the method used in the case of the crossbar 32, that is, by providing oversize holes for receiving the lower ends of the posts where they pass through the clamping members so that a slight amount of sidewise movement is allowed the post as well as a certain amount of tilting or rocking of the posts about their point of attachment to the clamping members. In FIG. 4 of the drawings is shown the method used in the case of the post 31 which, as here shown, is provided on its lower end with a journal 45 which is received in an oversize hole provided in a bushing 46 with fits snugly into a bore provided in the clamping member 17. The ends of the bushing project beyond the faces of the member 17 to form trunnions for one end of each of the links 18 and 19. The post 31 is retained within the bushing by a nut 47 which is screwed on a threaded tenion 48 formed on the lower end of the post. The nut 47 is not drawn up tightly against the bushing so as to allow clearance between the nut and the bushing as well as between a shoulder 49 on the post and the upper end of bushing. The post will thereby be permitted to partake of translatory movement in a direction normal to its longitudinal axis as well as rocking movement about its point of support on the clamping member which, in this case, is provided by shoulder 49.

A similar form of construction may be used in the case of the post 30, although the bushing may be omitted in this case if desired. As previously mentioned, the clamp-bolt 25 is secured to the post 30 and is accommodated in a slot 50 (FIG. 1) provided in the end of the clamping member 16 so as to permit the bolt to be swung outwardly to the unclamped position shown in FIG. 3. The post 30 is attached to the clamping member 16 by a nut 52 screwed onto a threaded tenon 53 formed on the bottom of the post 30.

The pivot links 18 and 19 for the clamping members are pivotally attached to the clamping member 16 by means of a screw 55 (FIG. 4), the shank 56 of which passes through an aperture provided therefore in the upper link 18. The main body of the shank 56 is journaled in a bore provided in an eccentric bushing 57 which is journaled in a bore provided in the member 16. The eccentric 57 is provided on its upper end with a screw driver slot 58 (FIG. 2) and is held in adjusted position by means of a set screw 59 which screws into a threaded hole in the member 16 and presses against the side of the bushing 57.

The screw 55 is provided with threads 60 on its lower end which engage with threads in a tapped hole provided in the bottom link 19. Hence, when the screw 55 is tightened as shown in FIG. 4, a shoulder 61 on the bottom of the shank 56 will be drawn tightly against the upper face of the link 19 and secure the screw to the link. Hence, the links 18 and 19 will move as a unit with the screw 55 and the shank 56 of the screw will rotate within the bore formed in the eccentric 57 to thereby form a pivot for the links in the clamping member 16. Any wear occurring between the shank of the screw and the eccentric 57, and any wear occurring between the bushing 46 and apertures in the links 18 and 19 may be taken up by adjustment of the eccentric 57.

As shown in FIG. 2, the link 18 and 19 do not lie exactly at right angles to the sides of the clamping members when they are closed upon a tube held in the clamping aperture but are canted slightly with respect to the perpendicular which, in FIG. 2, is indicated by the dot and dash line x—x. The inclination of the pivots of the links is such that the swinging member 17 of the clamping means is pivoted at a point slightly forward or closer to the aperture than the pivot for the links on the member 16. This will enable the swinging member 17 to move slightly rearward as shown in FIG. 3, when it is moved to its open position so that the heel 65 of tube clamping interest 66 will be permitted to move away from the tube as the member 17 is swung open.

The insert 66 and its companion insert 67 are receivable within the recesses 20 and 21 formed in the clamping members 16 and 17 for the purpose of accommodating the clamping means to tubing of different sizes. As best shown in FIG. 1, each of the clamping members is provided with a pair of retaining lugs 70 located at the bottom of the recesses and on opposite sides thereof. These are adapted to mate with grooves 71 (FIG. 6) formed on opposite edges of the inserts 66 and 67 so that when the inserts are slid into the recesses 20 and 21, the grooves 71 will move behind the lugs 70 and retain the inserts within the recesses. Each insert is adapted to be held against upward movement out of its associated recess by means of spring clip 72 (FIG. 7) secured to the upper face of its related clamping member 16 or 17. Each insert is provided at its upper end with a flange 73 which is adapted to seat on the upper face of its associated clamping member when the insert is in place. The upper faces of the flanges 73 are preferably countersunk as indicated by reference numeral 74 in FIG. 7 so that the flange of the insert will snap beneath the clip 72 and be held against lateral as well as vertical movement within the recess. Each insert is also provided with a chamfer 75 for supporting the outside wall of the tube 11 as it is flared outwardly by the cone 12.

Double flares may be formed with my improved type of tube flaring tool by the use of a novel type of double-flare die which is adapted to fit over the cone 12 of the flaring tool. As best shown in FIG. 5, the doubleflare die may be constructed in the form of a plate or washer 80 having a conical recess or seat 81 formed in one side of the plate 80 and a concavity or pressure face 82 formed in the other side of the plate 80. The conical recess 81 converges into plate 80 and intersects the surface of the concavity 82 substantially in a plane forming a circular aperture 84, surrounded by the annular concavity or pressure face 82. The conical recess 81 is complementary to the cone-shaped face of the flaring cone 12 so that the die 80 will seat snugly on the cone as illustrated in FIG. 5. The die 80 may be held in this position on the cone 12 by means of a plurality of spring clips 83 which are adapted to snap over the upper edge of the cone 12 and hold the die 80 in place thereon. The dies 80 are made in different sizes for the different sizes of tubes to be flared by the tool and, as shown in FIG. 5, the size of the aperture 84 in the die 80 should be approximately the same dimension as the inside diameter of the tube 11 so that the tube will contact the pressure face 82 of the die substantially in the plane of the aperture 84. Under these conditions, the tip portion of the flaring cone 12 projecting beyond the aperture 84 in the die 80 will serve as a stop to prevent inward movement of the end of the tube 11 as it is expanded upon downward movement of the cone 12 and die 80. After the tube 11 has been expanded by use of the double-flare die 80, the flaring cone 12 may be backed off and the die removed, whereupon the cone 12 may again be fed downwardly into the end of the tube 11 to fold the flange formed on the tube inwardly and complete the double-thickness flare on the end of the tube.

In FIG. 9 of the drawings is shown modified form of the double-flare die just described, the die plate 85 in FIG. 9 being of an elongated shape so as to accommodate a plurality of double-flaring dies of different sizes to correspond with the sizes of tubing handled by the tube flaring tool. As shown in FIG. 9, each die consists of an aperture formed in the plate with a conical surface 86 formed about the aperture on the upper side of the plate, and an annular concavity 87 surrounding the aperture on the bottom side of the plate. To conserve space, the conical faces 86 intersect one another is illustrated in FIG. 9 so that the dies may be placed closer together on the plate. This arrangement will not interfere with the proper seating of the die plate on the conical face of the flaring cone.

I have provided my improved form of tube flaring tool with a gauge for assisting the user of the tool in inserting the correct length of tubing in the tool to form an accurately dimensioned flare thereon. For this purpose I have provided a finger 90 which serves as a stop for the tube when it is pushed upwardly into the clamping aperture provided by the inserts 66 and 67. As shown in the drawings, this finger, or stop 90 is mounted on a square head 91 provided on the end of a plunger 92 which is slidably received within a transverse bore provided in the post 30. At is opposite end, the plunger is provided with a thumb screw 93 which is biased outwardly by a compression spring 94 coiled around the plunger beneath the thumb screw and bearing against the side of the post 30. The post is flatted on one side to provide a recess having top and bottom shoulders 95 (FIG. 8) for holding the plunger against rotation in any one of four positions to which it may be moved by pressing in on the thumb screw to compress the spring 94 and thereafter rotating the thumb screw to bring the stop 90 to the position desired. When the stop 90 is in its lowermost position, as indicated in FIG. 8 of the drawings, it will lie only slightly above the tops of the die inserts and will limit the insertion of the tube 11 to the proper extent to provide a single flare of correct dimensions. When the plunger 92 is turned 90° clockwise from the position shown in FIG. 8, the stop will lie at the proper height above the tops of the inserts to provide for a double flare of proper dimensions on the smallest of size tubing. Rotation of the plunger 92 through another 90° clockwise will bring the stop finger 90 to its highest position above the tops of the inserts where it will serve to correctly gauge the largest sizes of tubing for the formation of double flares thereon. Rotation of the stop 90 through another 90° clockwise will bring the finger to an intermediate position where it will gauge the insertion of intermediate sizes of tubing for the formation of double flares thereon.

Inasmuch as the plunger 90 is carried by the post 30, it will partake of the rocking movements of the post as the swing-bolt 25 is rocked from clamping position to unclamping position and vice versa. As shown in FIG. 2, when the clamp bolt 25 is in clamping position, the stop 90 will lie to one side of the tube clamping aperture formed in the clamping members 16 and 17 and so will not interfere with the operation of the flaring cone on the end of the tube held in the clamping members. When the clamping bolt 25 is swung to its unclamping position as shown in FIG. 3, the stop 90 will be moved over the clamping aperture and will serve to stop the tube as it is moved upwardly into position in the aperture formed by the die inserts. After the tube has been stopped by contact with the finger 90, the clamp bolt 25 may be swung to its clamping position after which the thumb nut 27 may be tightened to securely clamp the tube within the aperture preparatory to a tube flaring operation. With the movement of the clamp bolt to its clamping position, the finger 90 will be moved to the FIG. 2 position where it lies to one side of the tube and flaring cone.

The operation of my tube flaring tool is as follows:

The tool is made ready for flaring a given size of tubing by opening the clamping members and removing the die inserts 66 and 67 from the recesses 20 and 21 after which die inserts of a size corresponding to the tubing to be flared are inserted in the recesses. The inserts are placed in the recesses by sliding them downwardly therein so that the recesses 71 in the inserts engage behind the lugs 70 after which the flanges 73 are snapped beneath the clips 72. The tube gauge is then adjusted to the proper position by pressing in on the thumb screw 93 and turning the plunger until the square head 91 is properly positioned after which the thumb screw is released and the head permitted to seat in the flatted recess provided therefore on the post 30. The tube is now inserted in the clamping aperture and the clamping members are moved together to guide the tube as it is pressed upwardly against the stop 90. Still holding the clamping members together, the user of the tool now swings the clamp bolt 25 to its clamping position thereby removing the stop 90 from over the end of the tube and moving the bolt into the notch 26 provided therefore in the end of the clamping member 17. The wing nut 27 is now tightened to secure the tube within the clamping aperture. If a double flare is to be formed on the end of the tube, a double-flare die 80 (FIG. 5) of the proper size is clipped onto the flaring cone 12, or the alternate form of double-flare die 85 shown in FIG. 9 is utilized to effect the desired expansion of the upper end of the tube in the manner heretofore described. After the tube has been expanded by the double-flare die, the cone is backed off and the die removed whereupon the cone is again fed into the end of the tube to fold in the expanded portion of the tube and produce a double flare of the correct dimensions on the end of the tube.

In these operations, the cone 12 is able to line itself up accurately with the longitudinal axis of the tube 11 by reason of the lateral movement permitted the crossbar 32 by the oversize holes 39 and 40 provided therein. The freedom of movement provided on the lower ends of the posts 30 and 31 will permit slight rocking movement of the posts and thereby further assist the flaring cone to align itself with the axis of the tube 11. After the tube has been flared, the wing nut 27 may be released and the swing bolt 25 swung to the FIG. 3 position to permit the flared tube to be removed from the tool and an unflared piece of tubing to be inserted therein.

While I have described my invention in connection with one possible form or embodiment thereof and have used, therefore, certain specific terms and language herein it is to be understood that the present disclosure is illustrative rather than restrictive and that changes and modifications may be resorted to without departing from the spirit or scope of the claims which follow.

Having thus described my invention, what I claim as new and useful and desire to secure by United States Letters Patent, is:

1. A double-flaring die for use with the flaring cone of a tube flaring tool comprising a plate having a series of spaced apart apertures therethrough of different diameters, a truncated conical surface adjoining each aperture forming a seat in one side of said plate for receiving said flaring cone to extend through said aperture beyond the opposite side of said plate to center and guide the end of a tube, a pressure face on the opposite side of said plate adjoining each aperture for engaging and upsetting said tube end as the cone forces said plate against said tube end, and adjacent seats intersecting each other.

2. The invention according to claim 1 in which adjacent seats overlap each other.

References Cited by the Examiner
UNITED STATES PATENTS

| 1,955,913 | 4/1934 | Holsclaw | 153—79 |
| 2,595,036 | 4/1952 | Wolcott | 153—79 |
| 2,620,013 | 12/1952 | De Voss | 153—79 |
| 2,774,408 | 12/1956 | Franck | 153—79 |

CHARLES W. LANHAM, *Primary Examiner.*

NEDWIN BERGER, *Examiner.*